(12) United States Patent
Nugent et al.

(10) Patent No.: US 7,343,826 B1
(45) Date of Patent: Mar. 18, 2008

(54) SENSING DEVICE FOR A SAFETY BELT

(76) Inventors: Anthony Dean Nugent, 112 Crestpoint Ct., Cary, NC (US) 27513; Yie-Heh Hsu, 3F, No 111-8, Hsing Teh Rd., San Chung City, Taipei Hsien (TW)

( * ) Notice: Subject to any disclaimer, the term of this patent is extended or adjusted under 35 U.S.C. 154(b) by 0 days.

(21) Appl. No.: 09/309,879

(22) Filed: May 11, 1999

(51) Int. Cl.
*G01D 7/00* (2006.01)

(52) U.S. Cl. .................................. 73/862.42

(58) Field of Classification Search .......... 73/12.06, 73/12.14, 12.01, 12.09, 11.01, 862.042; 180/286; 280/806
See application file for complete search history.

(56) References Cited

U.S. PATENT DOCUMENTS

| | | | |
|---|---|---|---|
| 4,561,606 A * | 12/1985 | Sakakibara et al. | 242/107 |
| 5,476,287 A * | 12/1995 | Lichtwardt | 280/801.2 |
| 5,520,263 A * | 5/1996 | Suran et al. | 180/270 |
| 5,624,135 A * | 4/1997 | Symonds | 280/801.1 |
| 6,631,959 B1 * | 10/2003 | Amondo et al. | 297/485 |

* cited by examiner

*Primary Examiner*—Max Noori

(57) ABSTRACT

A sensing device for a safety belt comprising a tightening unit having a fastening plate; a pulling force recording unit fastening seat of the safety belt; an impact status recording unit; a record indication unit; and a cartridge housing containing these units therein, wherein the pulling force recording unit comprises a clipping frame containing a fastening rim with one end protruded out therefore, and an engaging element capable of changing the resistance value when a pulling force is exerted, the impact status recording unit comprises a pendulum, on a circuit board, which changes the resistance value of the circuit board by the swinging of the pendulum, and the fastening status recording unit comprises an enumerating sensing switch, and the electrical signal and resistance of the units are transferred to the record indication unit.

2 Claims, 18 Drawing Sheets

SENSING DEVICE FOR A SAFETY BELT

This application claims the benefit of priority of Taiwan app. ser. no. 088106974, filed Apr. 29, 1999.

BACKGROUND OF THE INVENTION a) Technical Field of the Invention

The present invention relates to a sensing device for a safety belt, and in particular, to a sensing device which can be connected to the safety belt to sense and to record the pulling force of the safety belt caused by an impact, direction of the impact and the impact force, so as to provide a status proof of fastening the safety belt.

b) Description of the Prior Art

As shown in FIG. 1, the conventional safety belt includes a fastening plate 1 and a fastening seat 2. When the fastening plate 1 is inserted into the seat 2, the safety belt can provide a mere function of holding the user. The conventional belt does not have a sensing function. It is very common for the driver or the passenger to forget to put on the safety belt when he gets into the car. When the car hits a big object, or a great impact has occurred to the car, the driver or the passengers may be hurt if the belt has not been put on properly.

In a school bus carrying a number of school children, it is possible that some school boys play with the belt as if the belt is a toy by frequently releasing and fastening on the safety belt. It may not have sufficient number of guardians in the school bus to look after the children. Therefore, the children without putting on the belt may be hurt if an accident or an impact is caused to the bus. This is because the conventional belt does not have a sensing device to provide a warning signal to the user.

SUMMARY OF THE INVENTION

Therefore, it is an object of the present invention to provide a sensing device for a safety belt, wherein the sensing device can be connected to a safety belt and the sensing device is provided with a enumerating recording switch to provide a enumerating recording signal with respect to seat belt fastening.

Another object of the present invention is to provide a sensing device for a safety belt, wherein the sensing device can be connected to a signal processor to process the signals transmitted from the sensing device.

Yet another object of the present invention is to provide a sensing device for a safety belt, wherein a pulling force recording unit is mounted such that the unit can precisely record the instantaneous pulling force of the safety belt when an impact to the car is occurred.

It is another object of the present invention to provide a sensing device for a safety belt, wherein an impact status recording unit is provided to the sensing device such that the impact force and the direction of impact can be precisely recorded if an impact to the car is occurred.

Yet another object of the present invention is to provide a sensing device for a safety belt, wherein the sensing device is compact and portable.

Another object of the present invention is to provide a sensing device for a safety belt, wherein the sensing device can be mounted together with the fastening seat of any conventional safety belt.

Additional advantages of this invention will become apparent from the description which follows, taken in conjunction with the accompanying drawings.

DETAILED DESCRIPTION OF THE PREFERRED EMBODIMENT

Figure 1:
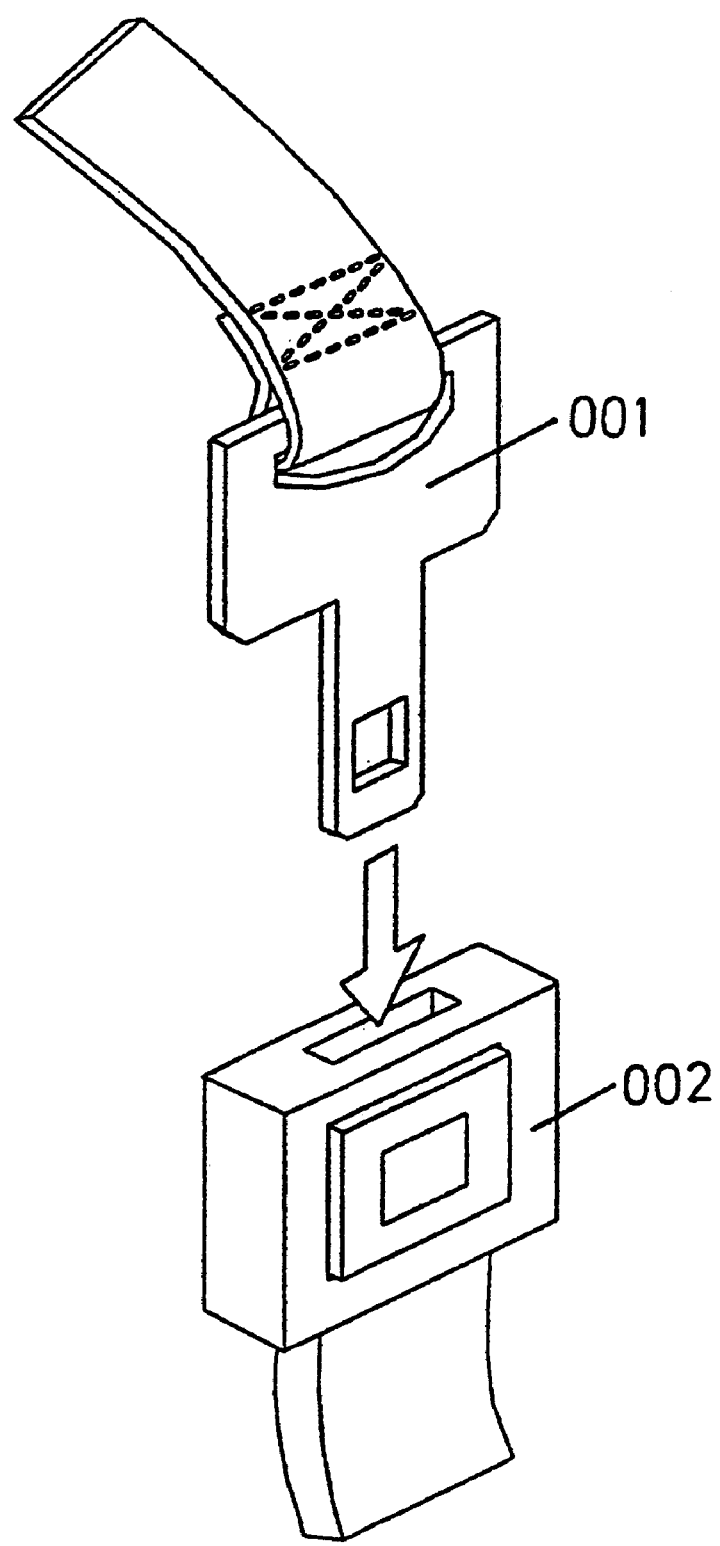
FIG. 1 is a schematic view of a conventional safety belt fastener.

FIG. 1 illustrates a conventional safety belt. In application, the belt provides a pulling protection to the wearer. The conventional safety belt does not provide a sensing device to record the status of application of the belt.

Figure 2:
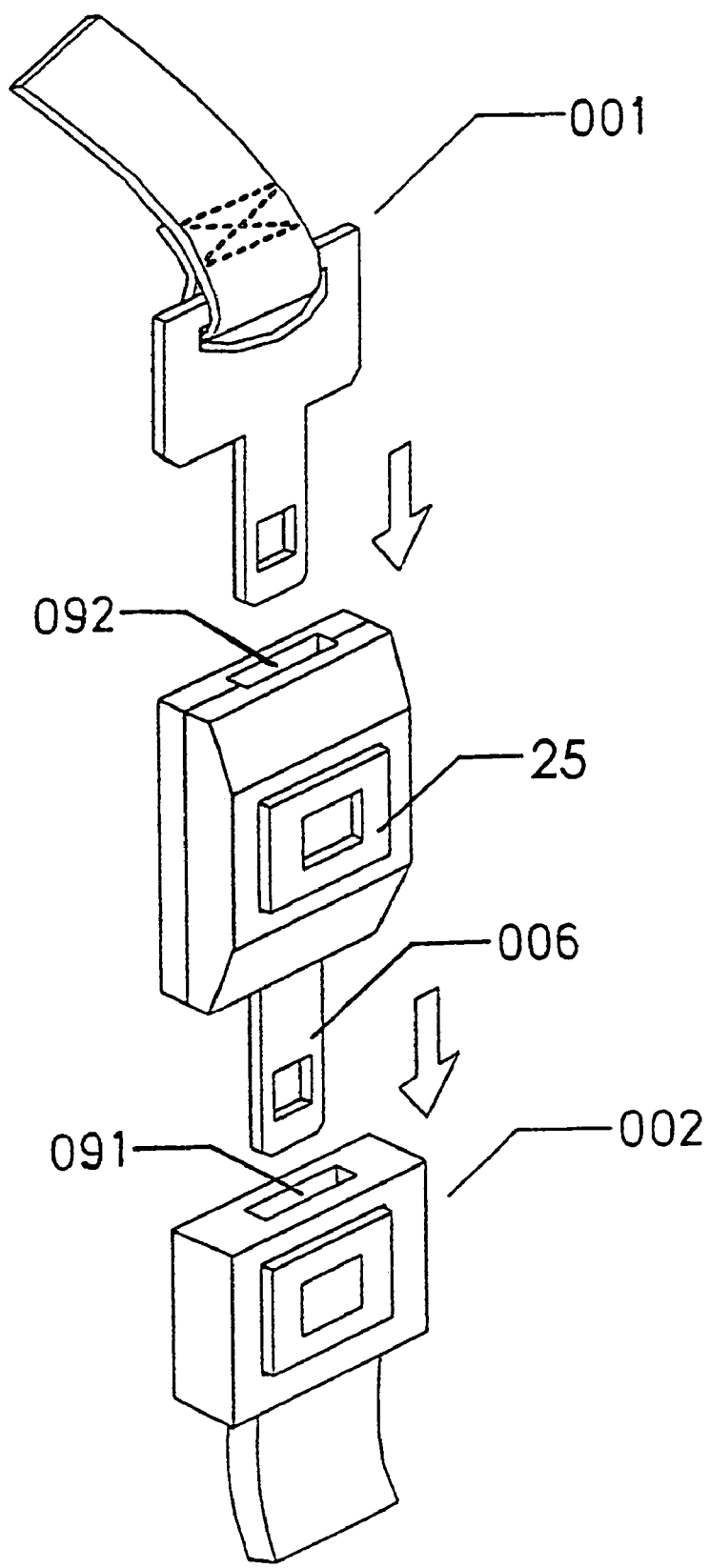
FIG. 2 is a schematic perspective view of a sensing device to be mounted to a safety belt in accordance with the present invention.
Figure 3:
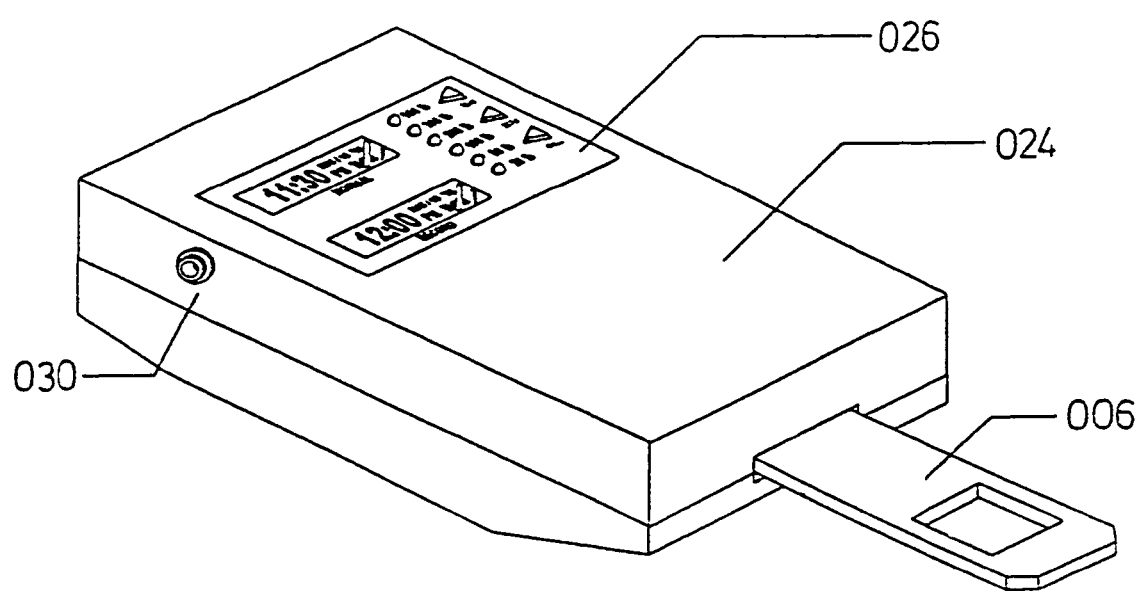
FIG. 3 is a perspective view of the sensing device for a safety belt in accordance with the present invention.

Referring to FIG. 2, there is shown the sensing device to be mounted to the safety belt. As shown in FIG. 3, the sensing device 3 has one protruded fastening loop 6 insertable into a mounting slot 91 of the fastening seat 2 of the safety belt. One edge of the sensing device 3 is provided with a fastening recess 92. A releasing button 25 is mounted on one lateral face of the sensing device 3 for the releasing of the fastening plate 1 of the safety belt from the sensing device 3. On the opposite lateral side of the sensing device 3, a stencil plate 26 with function indication is provided. Along one edge of the sensing device 3, a signal socket 30 is mounted.

Figure 4:
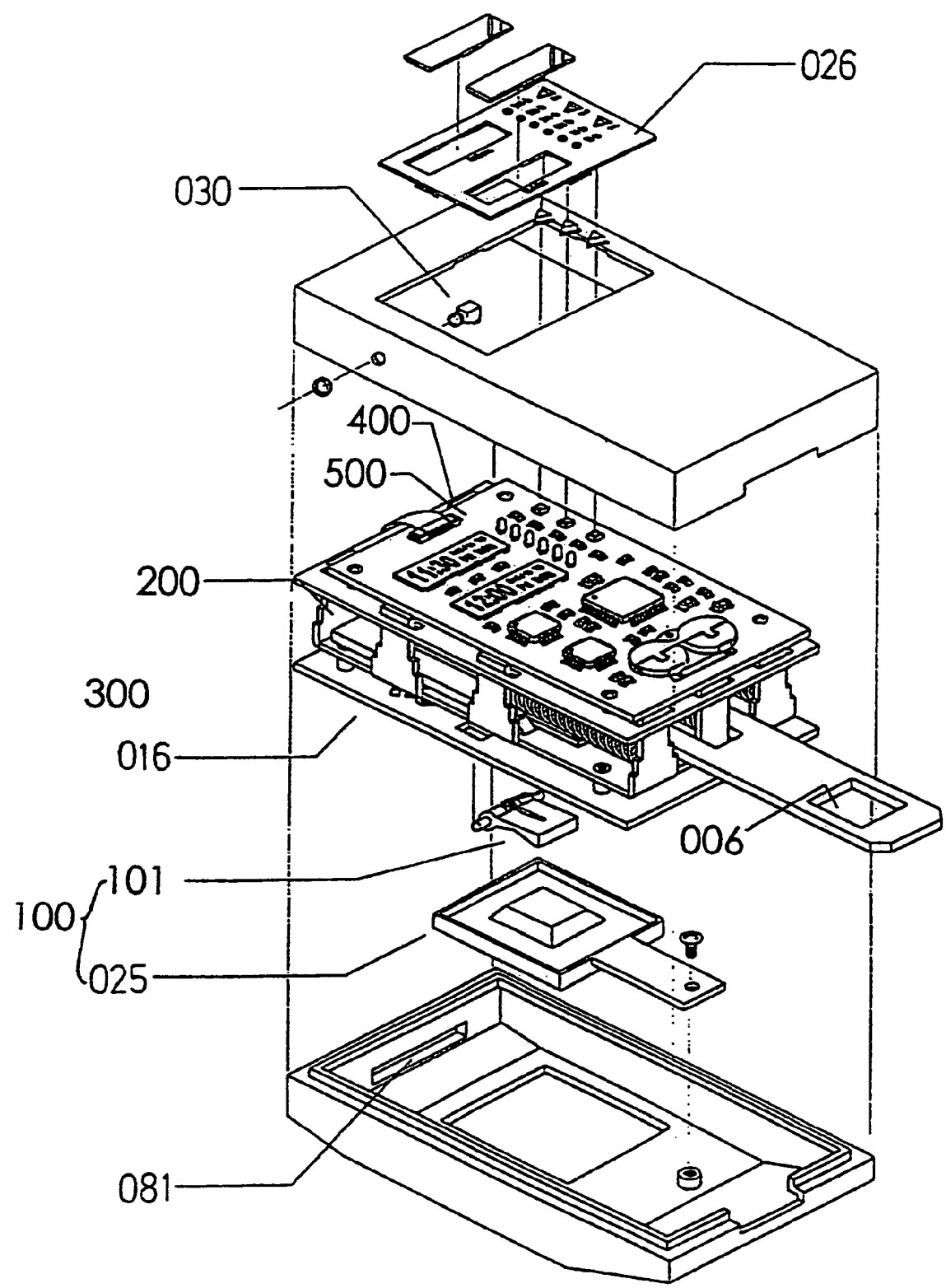
FIG. 4 is a perspective exploded view of the sensing device in accordance with the present invention.

Referring to FIG. 4, there is shown a perspective view of the sensing device of the present invention. The sensing device 3 comprises a tightening unit 100 for mounting with the fastening plate 1 of the safety belt; a pulling force recording unit 200 for mounting to the fastening seat 2 of the safety belt; an impact status recording unit 300; a fastening status recording unit 400; a record indication unit 500.

Figure 5:
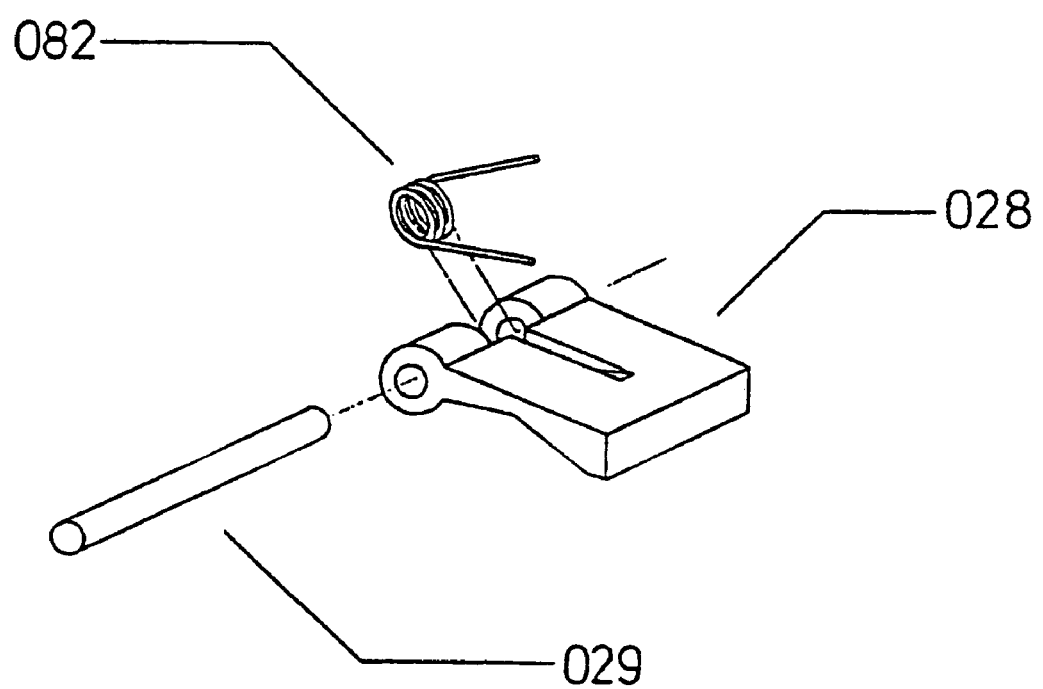
FIG. 5 is a perspective exploded view of an engaging element of FIG. 4 in accordance with the present invention.

The tightening unit 100 comprises an engaging element 101 and a releasing button 25. The engaging element 101 is mounted adjacent to the lateral face close to the releasing button 25 for engaging with the fastening plate 1 of the safety belt. As shown in FIG. 5, the engaging element 101 comprises a fastening board 28 having one end mounted with a rotating shaft 29 having a twisting spring 82. The reverse twisting of the spring 82 causes the fastening board 28 to produce an engaging action.

Figure 6:
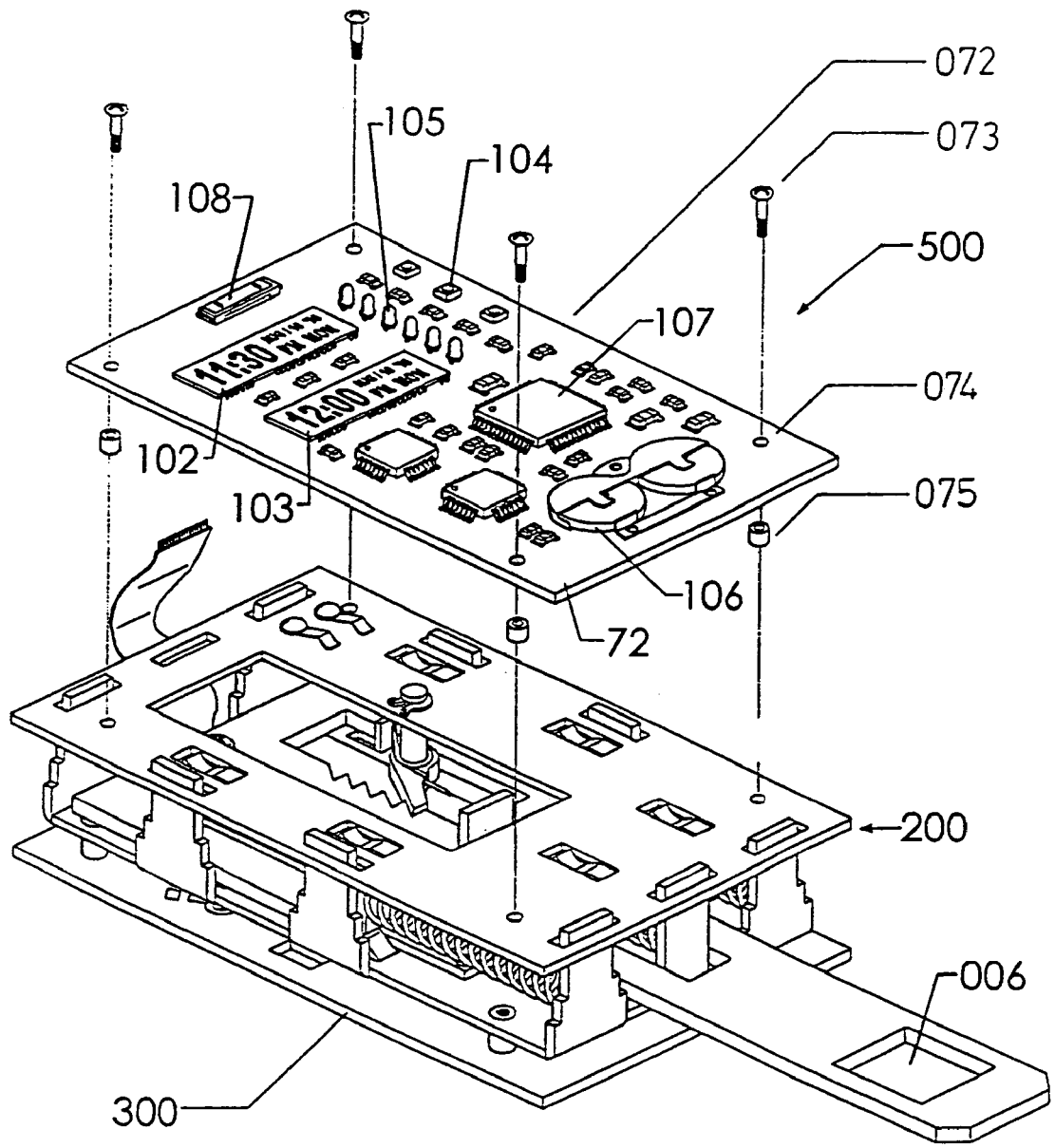
FIG. 6 is a perspective exploded view of the sensing device for a safety belt, indicating the recording indication unit, in accordance with the present invention.
Figure 7:
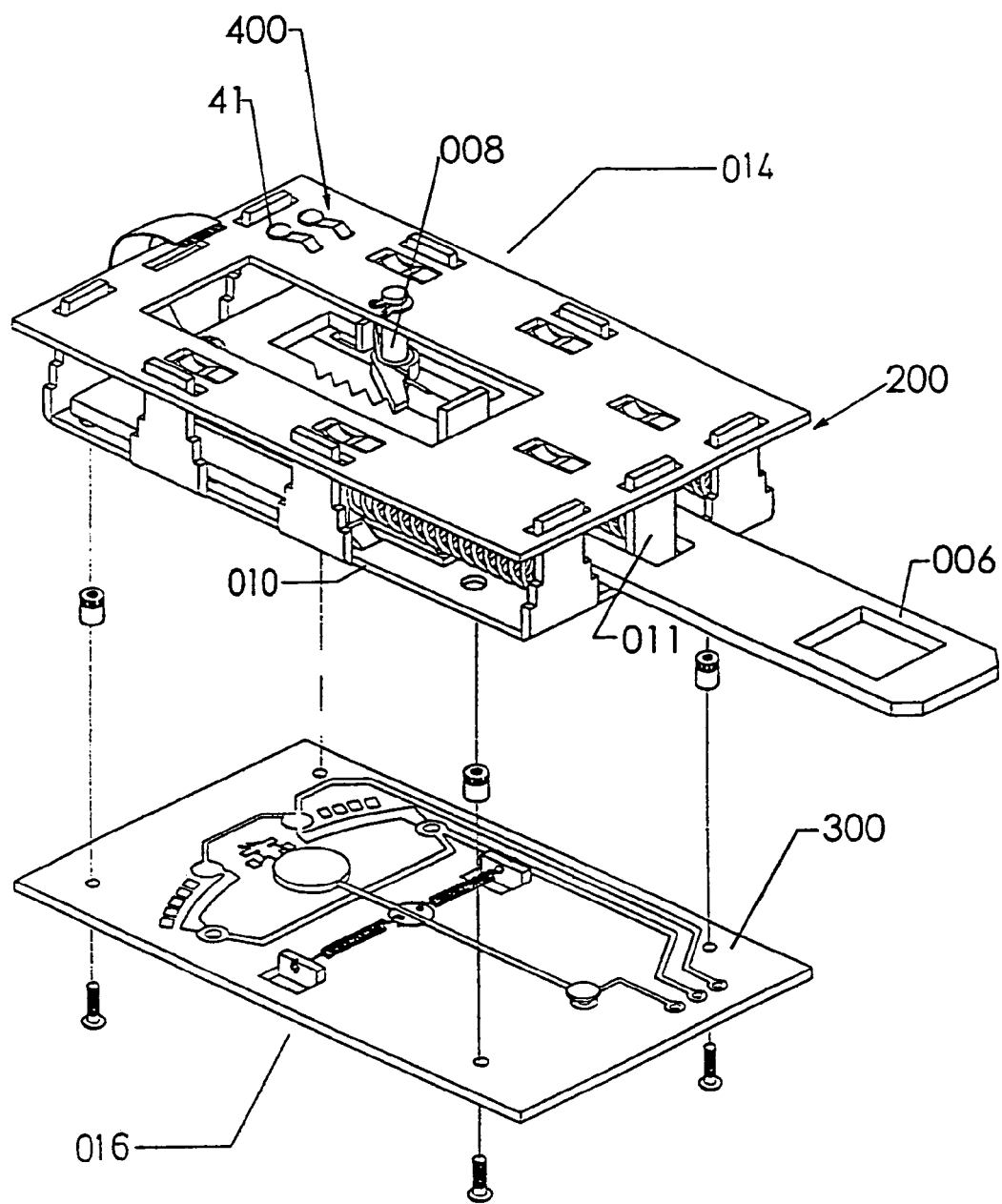
FIG. 7 is a perspective exploded view of the sensing device for a safety belt, indicating the pulling force recording unit of the present invention.
Figure 8:
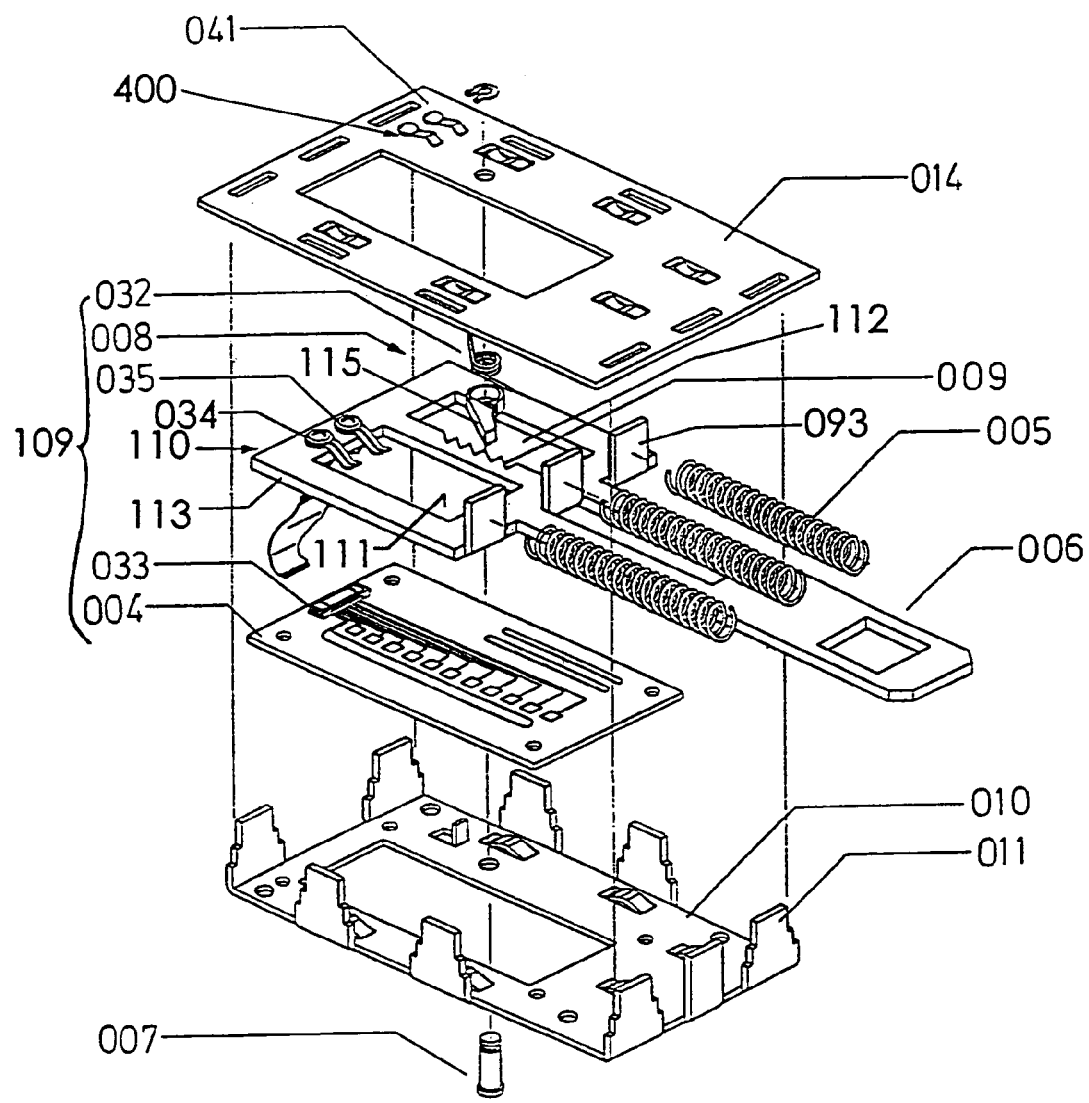
FIG. 8 is a perspective exploded view of the pulling force recording unit of FIG. 7 of the present invention.
Figure 9:
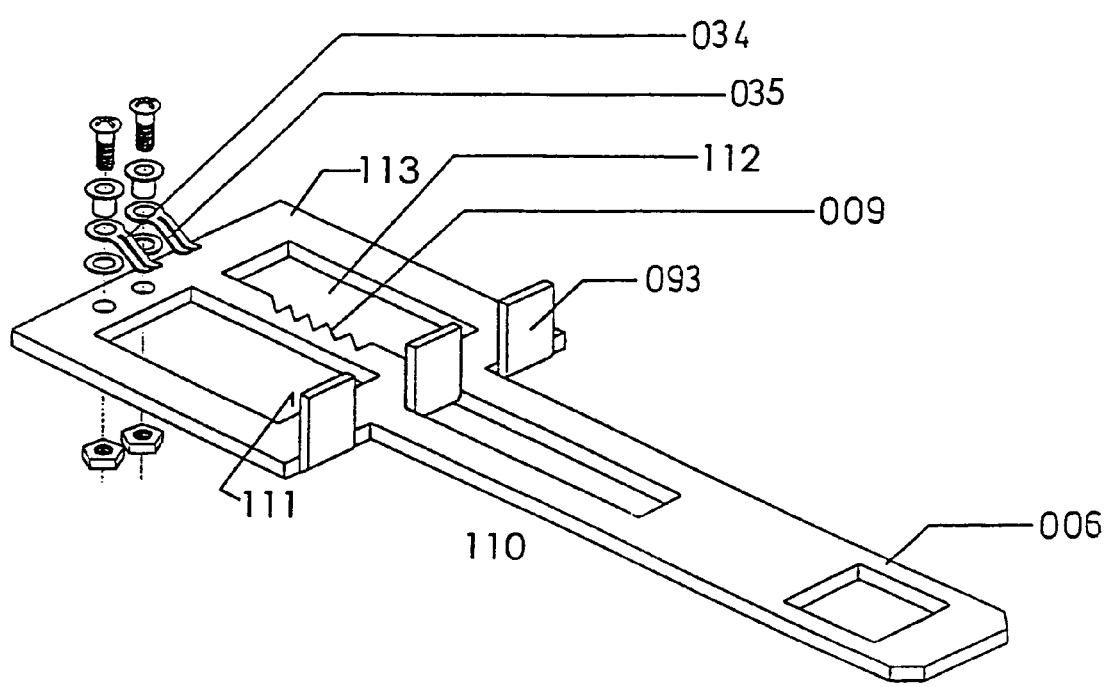
FIG. 9 is a perspective exploded view of the fastening plate of FIG. 8 of the present invention.

FIG. 6 is a perspective exploded view of the sensing device 3. On an indication circuit board 72, there are mounted with two timing indication circuits 102, 103, a time adjusting button 104, an impact indication light 105, at least one battery 106, a plurality of ICs 107, and a signal line connector 108. At normal circumstance, the two timing indication circuits 102, 103 record time simultaneously and are controlled by the time adjusting button 104. If an impact has occurred, one timing indication circuit 102 receives an impact signal from other units, such as units 200, 300. At this moment, time recording stops so as to indicate the impact time. The other time indication circuit shall not be affected but continues its time recording.

At an appropriate position on the board 72, a plurality of screws 73 are employed to fasten the board 72 together with the pulling force recording unit 200. The screws 73 pass through the screw holes 74 and shaft pads 75 prior to mounting the board 72 with the unit 200.

As shown in FIGS. 7, 9, 10, 11, a clipping frame 10, and a mounting frame 14 contain a fastening loop 6 protruded from one end of the frame 10, and an elastic mounting unit 109. A number recording switch 41 is provided on the mounting frame 14. This switch 41 is connected to the signal socket 30 so as to transmit an alarming signal if the belt has not been fastened and to transmit the enumerating of fastening the belt signal.

The elastic mounting unit 109 comprises an elongated plate 110, a circuit board 4 having the function of converting the pulling force into electrical resistance, a plurality of compression springs 5, and a stopping gear assembly 8. The stopping gear assembly 8 has a gearing element 112 mounted with a peg 7 having been inserted with a twisting spring 82. The gearing element 112 faces a positioning ratchet 9. The two ends of the peg 7 are mounted perpendicularly with the clipping frame 10 and the mounting frame 14. The gearing element 112 is positioned to the ratchet 9 when the elongated plate 110 is pulled out. The two ends of the spring 5 respectively urge the spring support 93 and the resisting plate 11, such that the elongated plate 110 is positioned in between the clipping frame 10 and the mounting frame 14. When at great impact, the impact force produces a greater displacement force than the spring 5 the support 93 presses the spring 5 such that the elongated plate 110 moves slightly. The circuit board 4 is mounted adjacent to the elongated plate 110.

Figure 10:
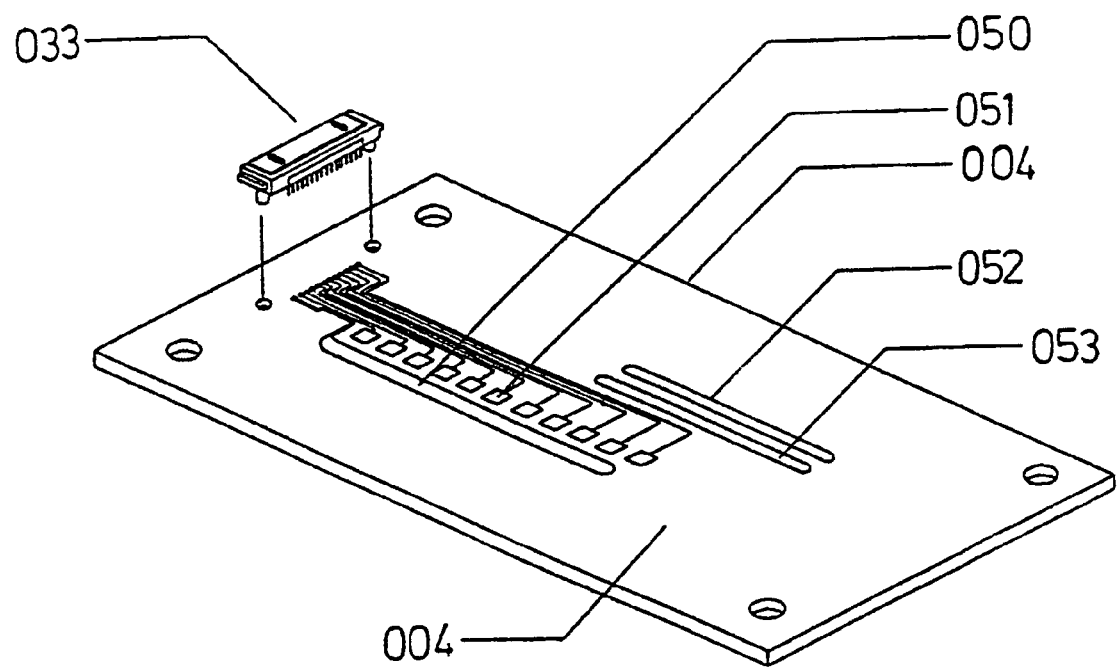
FIG. 10 is a perspective exploded view of the pulling force resistance circuit board of FIG. 8 of the present invention.

As shown in FIG. 10, a conductive layer 50, a plurality of variable electrical resistance layers 51, two parallel high impact conductive layers 52, 53 and a signal output connector 33 are mounted on the board 4. The variable resistance layer 51 is parallel to the conductive layer 50. These layers 50, 51 can contact with the spring plate 34 and the conductive layers 52, 53 are further away from the spring plates 34, 35.

When the displacement of the elongated plate 110 is great, the spring plate 35 touches the conductive layers 52, 53 to output a strong impact signal. These layers 50, 51, 52, 53 transmit the conductive signals, via the signal output connector 33, to the record indication unit 500.

Figure 11:
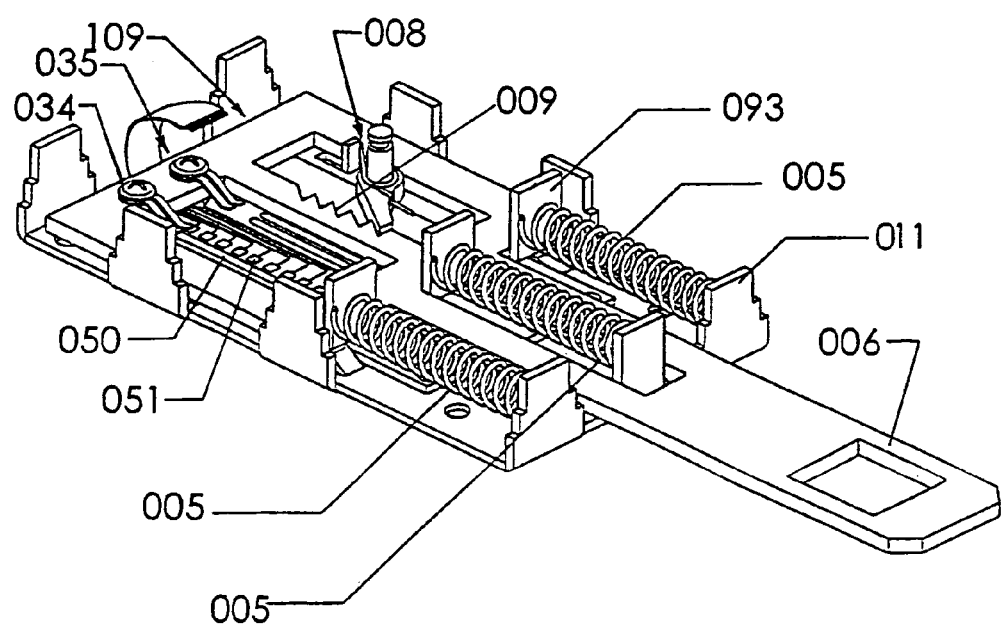
FIG. 11 is a perspective view of the elastic mounting unit of FIG. 8 of the present invention.

As shown in FIG. 11, if an impact has occurred, the fastening loop 6 is pulled out to a distance which has corresponding layers 50, 51, 52, 53 and are conductive and output a corresponding electrical resistance value.

Figure 12:
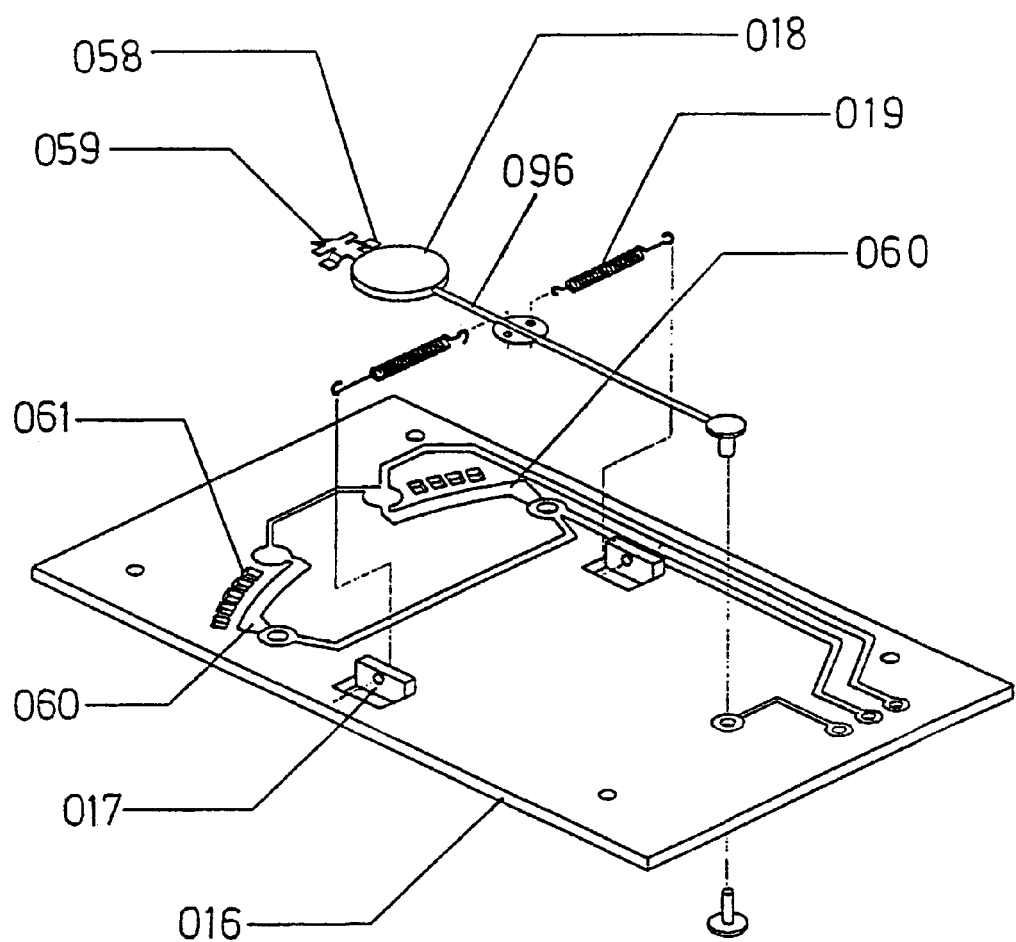
FIG. 12 is a perspective exploded view of the impact recording unit of FIG. 7 of the present invention.

As shown in the figure, the impact status record unit 300 is connected to the elastic mounting unit 109 which is connected to the record indication unit 500. As shown in FIG. 12, the unit 500 has a circuit board 16 comprises a pendulum 96 having a heavy weight body 18 at one end. The pendulum 96 is made from a conductive material. At the end closer to the heavy weight body 18, a fastener body 114 having a pressing tip 59 to press the circuit board 16 is provided. At the lateral side of the fastener body 114, a pressing contact 58 is provided. A thin spring 19 is mounted across the edge of the board 16. On the arc-shaped path formed by the swinging movement of the pressing tip 59, a plurality of engaging recesses 61 is formed on the board 16. On the arc-shaped path formed by the swinging of the pressing contact 58, a resistance membrane 60 is formed on the board 16. A pair of mounting hooks 17 are mounted on the board 16 to engage to one end of the thin spring 19. The other end of the spring 19 is connected to the pendulum 96, such that the board 16 is connected to the pendulum 96 and formed a conductive circuit, which is connected, together with the circuit of the resistance membrane 60, to the connecting point of the record indication unit 500. Thus, after the pendulum 96 is mounted to the circuit board 16 and by means of the balancing effect of the two thin springs 19, the pendulum 96 is maintained at the center. Thus, the pendulum 96 is used as a switch by means of sensing vibration moment.

Figure 13:
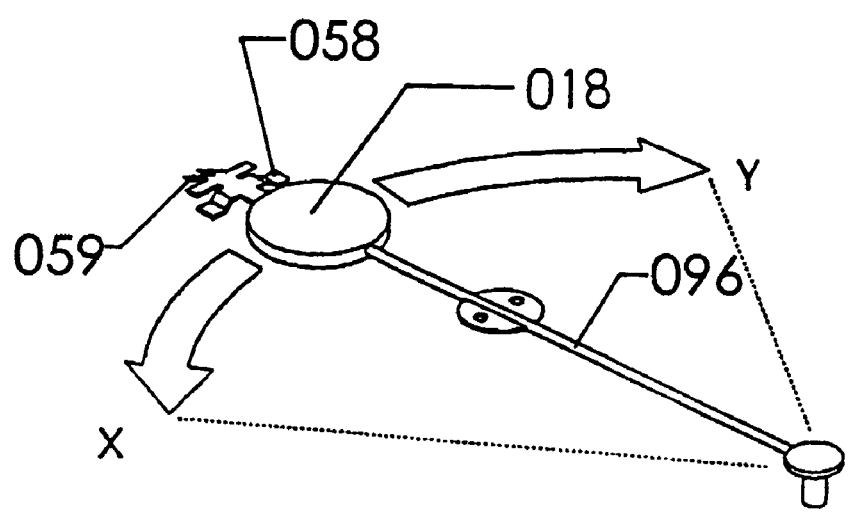
FIG. 13 is a schematic view illustrating the movement of the pendulum of FIG. 12 of the present invention.
Figure 14:
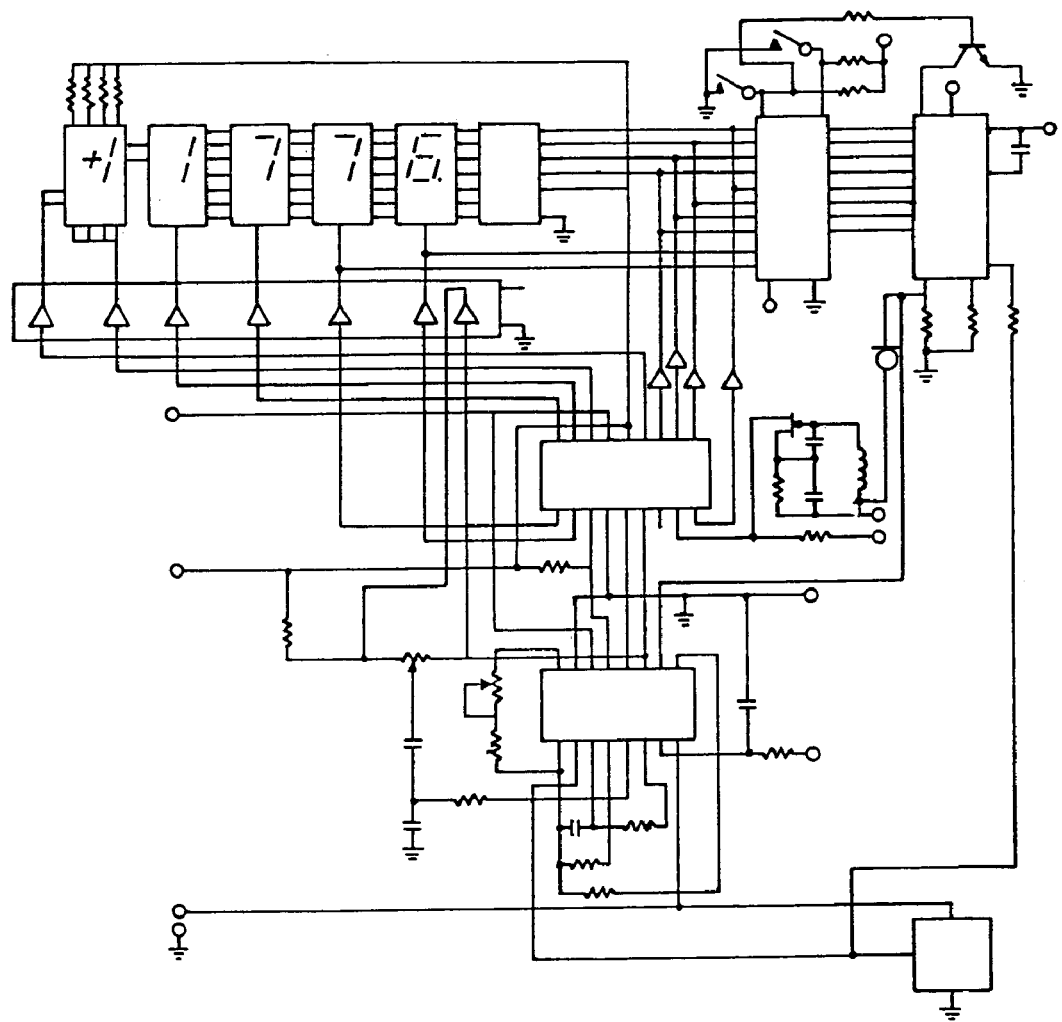
FIG. 14 is a circuit diagram of the enumerating of fastening the present invention.
Figure 15:
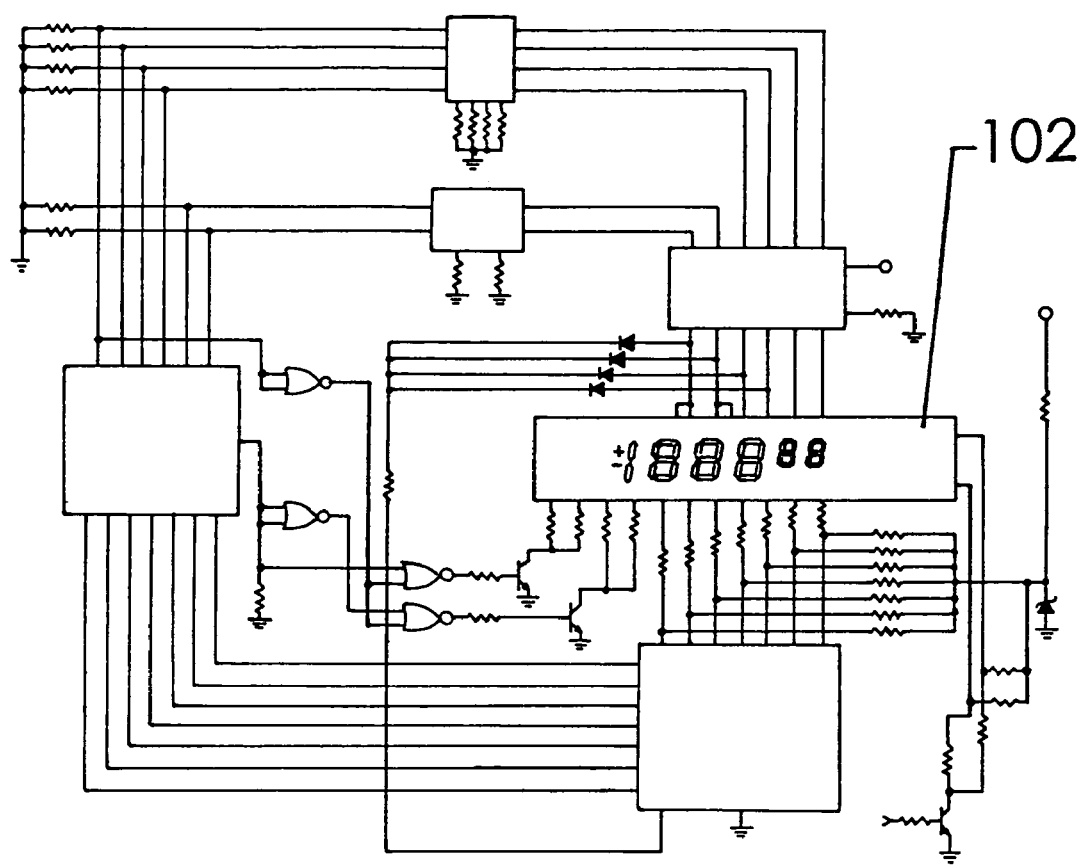
FIG. 15 is a circuit diagram of impact time memory of the sensing device of the present invention.
Figure 16:
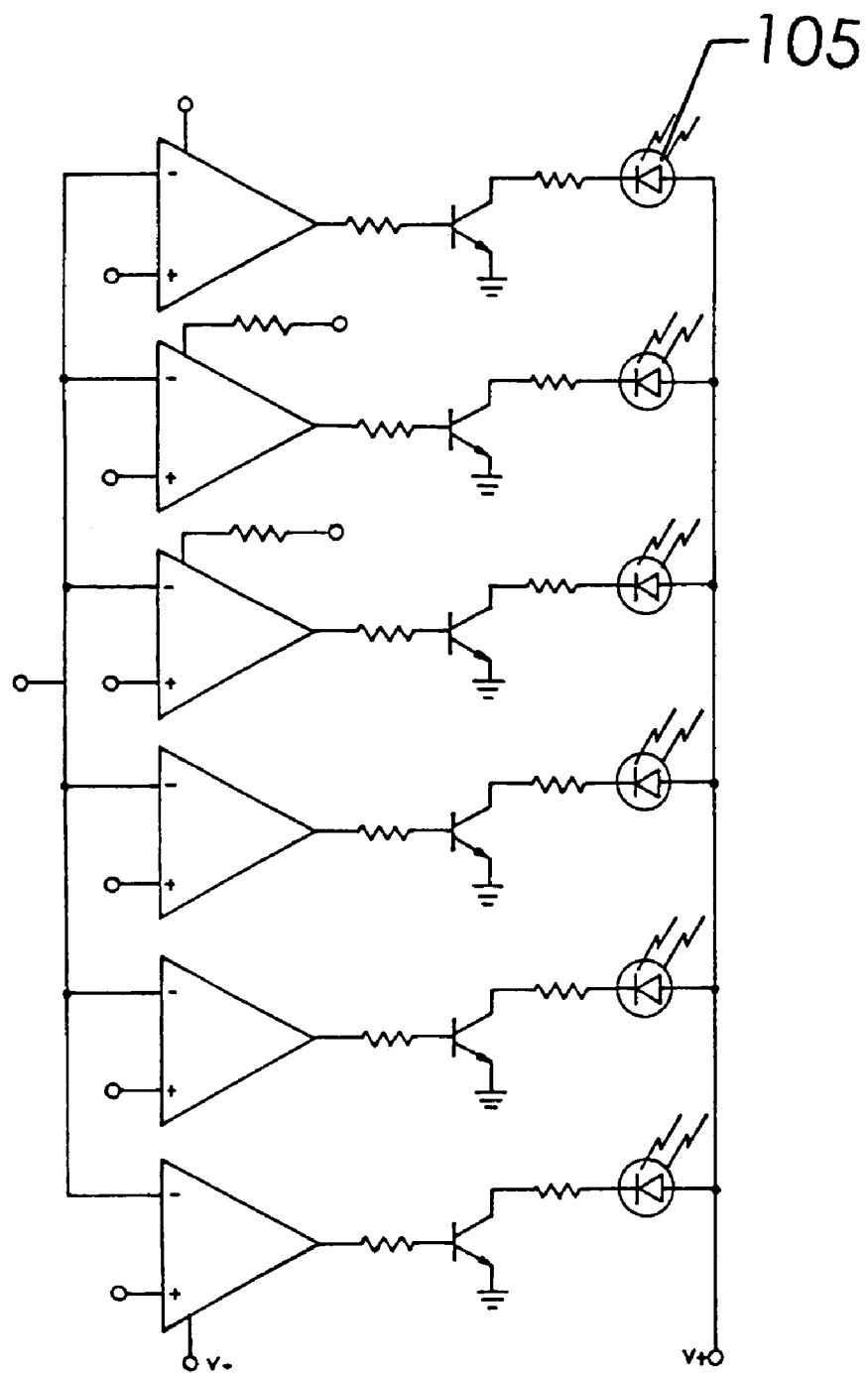
FIG. 16 is a circuit diagram of the pulling force indication of the sensing device of the present invention.
Figure 17:
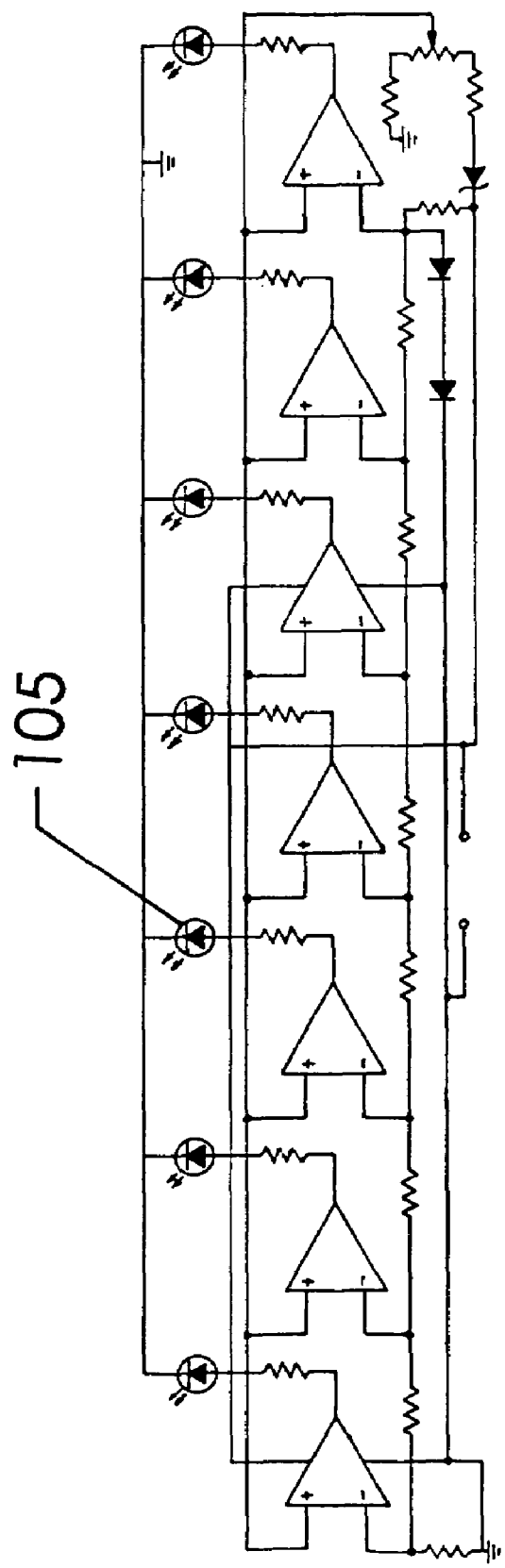
FIG. 17 is a circuit diagram of the impact force indication of the sensing device of the present invention.

Referring to FIG. 13, a schematic view illustrating the movement of the pendulum. When an accident is occurred, the instantaneous force produced by the impact is greater than the pulling force of the thin spring 19 such that the pendulum 96 swings to a position with minimum kinetic energy. The pressing tip 59 is engaged with the engaging recess 61 such that the pendulum 96 is deadly engaged and fixed. At the same time, the pressing contact 58 slides to contact with the resistance membrane 60 at the corresponding position such that the resistance value at that position is transmitted out. The impact force, and direction of impact can be converted into a corresponding resistance value which can be electrically analyzed and the indication of impact is shown in pound.

FIGS. 14 to 17 are circuit diagrams, and the structure, and the principle are corresponding to the above described recording indication unit 500.

Figure 18:
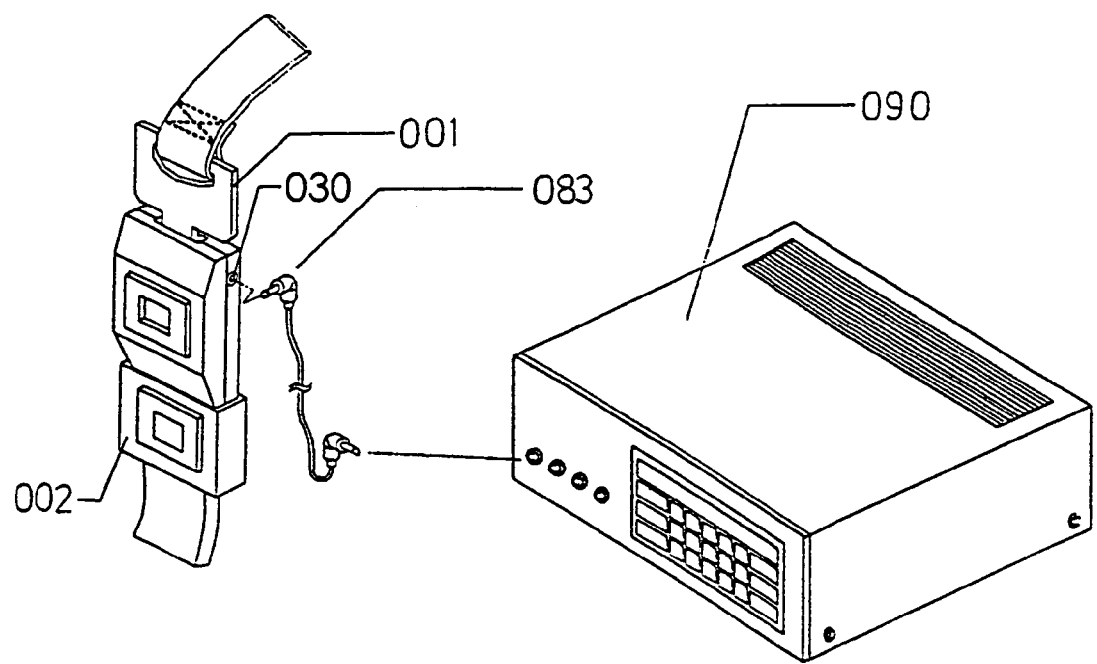
FIG. 18 is a perspective view of a signal processor in combination with the sensing device mounted with the safety belt.

In application of the present invention, as shown in FIG. 18, the signal socket 30 of the sensing device is connected with a signal line 83 to the signal processor 90 for signal processing. The signal processor 90 possesses the ability to determine signals such as unfastening of safety belt, in appropriateness of belt-releasing, so that a signal or an alarming sound is provided.

Many changes, modifications, variations and uses of the present application will become apparent to those skilled in the art after considering this specification and the accompanying drawing which disclose the preferred embodiment thereof. All such changes, modification, variations and other uses which do not depart from the spirit and scope of the invention are deemed to be covered by the invention which is limited by the claims which follow.

The invention claimed is:

1. A portable vehicular seat belt sensing device attachable to the buckling system of a vehicular safety belt comprising a pulling force indicating recording unit, an enumerating recording switch that verifies seat belt fastening in the event of impact to the vehicle wherein two timing indication circuits record time simultaneously, and wherein when said impact to said vehicle occurs, one timing indication circuit receives a signal from said pulling force indicating recording unit and stops advancing the time so as to indicate the time of said impact.

2. The seat belt sensing device according to claim 1 wherein said pulling force recording unit comprises a clipping frame containing a protruding fastening loop at one end and a fastening recess at the opposite end, said loop and said recess adapted to engage with said vehicular seat belt, and an elastic mounting unit capable of changing the pulling force into an electrical resistance value when a pulling force is exerted in response to said impact.

* * * * *